Aug. 9, 1938.    B. A. LINDERMAN    2,126,200
METHOD OF MAKING PUMP GEARS
Filed March 14, 1935    2 Sheets-Sheet 1
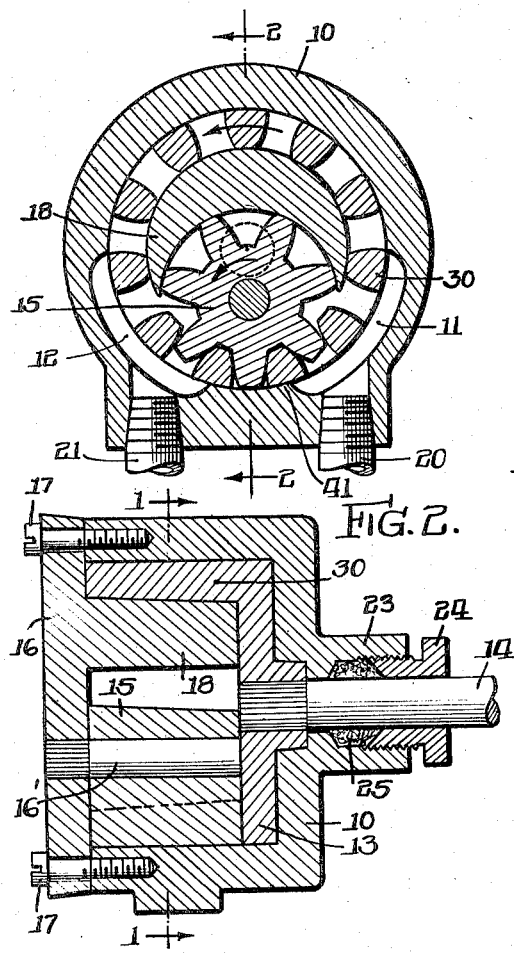
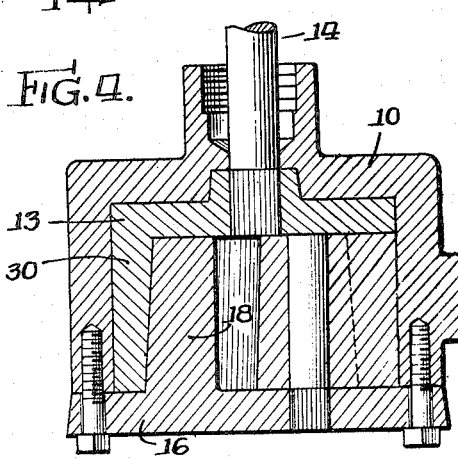
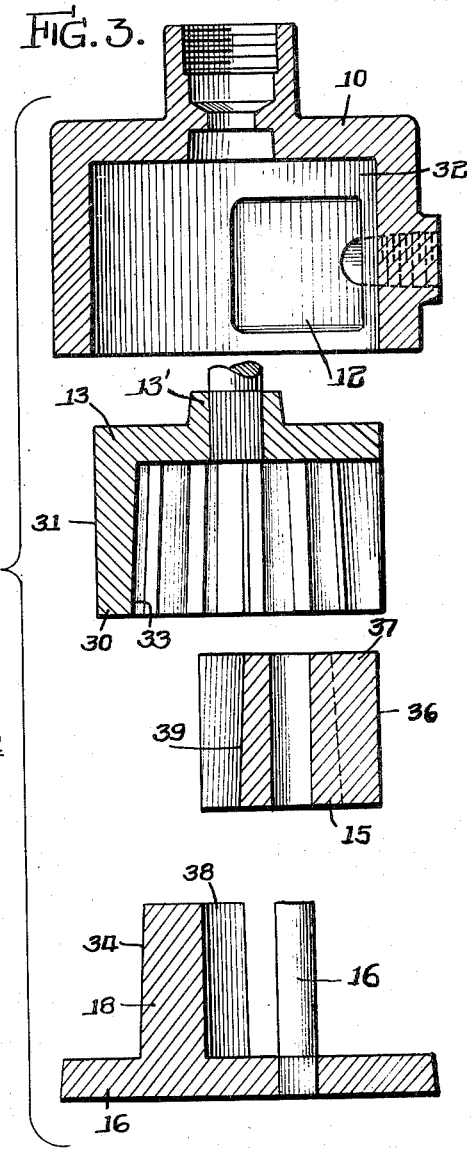
Inventor:
Bert A Linderman
By:- Cox & Moore attys

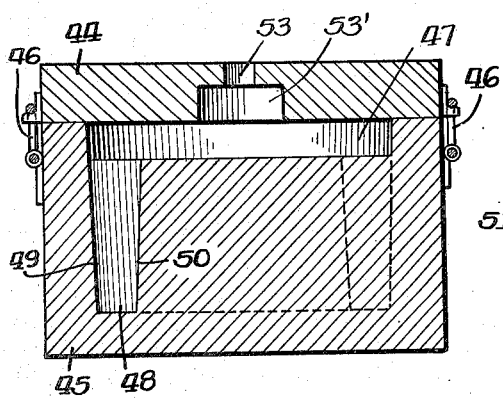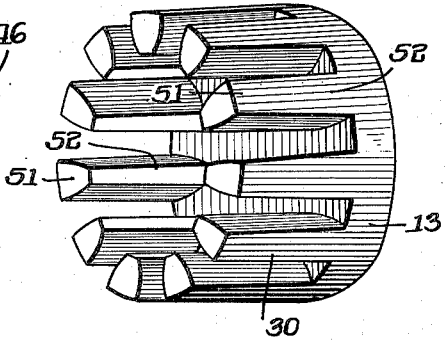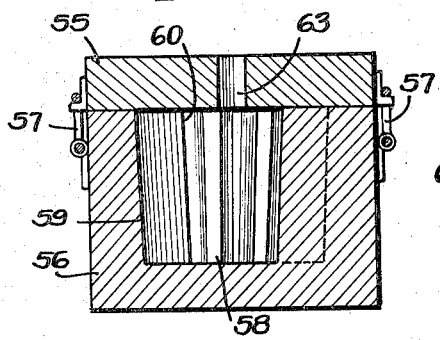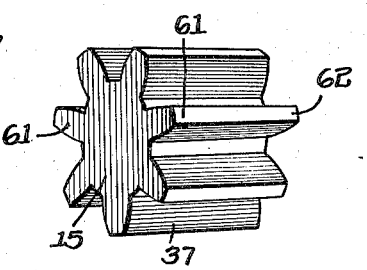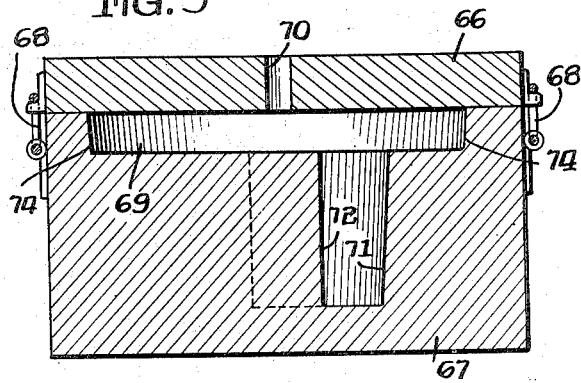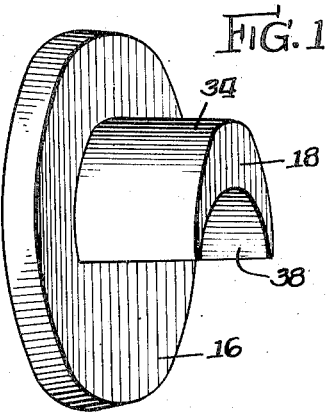

Patented Aug. 9, 1938

2,126,200

UNITED STATES PATENT OFFICE 2,126,200

METHOD OF MAKING PUMP GEARS

Bert A. Linderman, Detroit, Mich.

Application March 14, 1935, Serial No. 10,970

5 Claims. (Cl. 29—156.8)

This invention relates to a new article of manufacture and to the method of producing it, and more particularly to a pump of the gear type and to a novel method of producing the several pump parts.

In accordance with the present invention the several parts of a pump of the gear type, including the operating gears, are produced by a die casting operation. After the die casting certain machining operations may be performed upon the castings but the teeth of the gear elements are formed by the die casting process, and the machining operations which may be required upon the gears do not include any tooth cutting or shaping. Milling and tooth cutting operations, which are a source of considerable expense in the production of gears, are therefore avoided. The invention contemplates die casting the parts of hard and strong wear-resisting metal, or die casting them of softer metal and thereafter coating them with hard wear-resisting metal, the coating preferably being effected by electro-plating.

Accordingly, it is an object of the invention to produce an article of manufacture such as a pump or the like, and various operating parts thereof including intermeshing gears, in an economical manner. The article produced, however, being wholly efficient in operation and just as strong and durable as like articles produced by more expensive means.

It is a further object to provide finished teeth upon intermeshing gears by a new method of production, without expensive tooth cutting or milling operations.

Still further objects of the invention are to provide as a new article of manufacture, a machine assembly composed essentially of die cast parts; and to produce such an assembly by a method which involves a die casting of the parts of hard metal or a die casting of them of softer metal followed by the coating of the die castings with a hard and wear-resistant metal; more specifically, to produce a gear or like pump part or pair of intermeshing gears by such die casting operations.

Other objects and advantages of the invention will be apparent from the following description, when taken in connection with the accompanying drawings, wherein there are disclosed certain preferred embodiments of the invention.

In the drawings, wherein like reference numerals refer to like parts throughout.

Figure 1 is a transverse sectional view through a pump of the gear type showing the operating parts thereof, the view being taken substantially along the line 1—1 of Fig. 2.

Figure 2 is a longitudinal sectional view of the pump of Fig. 1 taken substantially along the line 2—2 thereof.

Figure 3 is an exploded view showing the several pump parts and the method of assembling them, the parts being shown in section similar to Fig. 2.

Figure 4 is a view showing the parts of Fig. 3 in assembled relation.

Figure 5 is a sectional view of the dies in which the rotor element is cast.

Figure 6 is a perspective view of the cast rotor element.

Figure 7 is a sectional view of the dies in which the pinion is cast.

Figure 8 is a perspective view of the cast pinion.

Figure 9 is a sectional view of the dies in which the crescent member is cast, and Figure 10 is a perspective view of the cast crescent member.

For purposes of illustration the invention is shown embodied in a pump of the type disclosed. However, it is to be understood that the invention and the various principles thereof are also applicable to other devices, and particularly to devices having intermeshing gear elements, the teeth of which are ordinarily formed by expensive milling and tooth cutting operations.

The pump shown for purposes of illustration, referring particularly to Figs. 1 to 4, inclusive, comprises a casing 10 having an inlet chamber 11 and an outlet chamber 12, and within the body of which rotates the pinion 15 and the rotor 13 having an operating shaft 14. A crescent plate 16, secured to the bottom of the pump casing 10 by means of studs 17, has its crescent shaped projection 18 extending into the pump interior and between the rotor and the pinion. The plate also carries the pin 16' upon which the pinion 15 is rotatably mounted. An inlet conduit 20 communicates with the inlet chamber 11 of the casing, and an outlet conduit 21 communicates with the casing outlet chamber 12. The conduits 20 and 21 may be threaded into position within the casing. The drive shaft 14 of the rotor is journalled in the pump casing by means of a bearing extension 23 formed integral with the casing, within which is threaded the gland 24, which holds the packing 25 in place. The packing prevents escape of the fluid being pumped outwardly from the pump interior along the drive shaft of the rotor.

The extending teeth 30 of the rotor bear at their outer sides 31 against the interior surface 32 of the casing and at their inner sides 33 against the outer surface 34 of the crescent projection. The tops 36 of the pinion teeth 37 bear against the inner surface 38 of the crescent and against the interior casing surface at various points in their rotation, and the bottoms 39 of the pinion teeth cooperate with the inner sides 33 of the rotor teeth. The operation of the pump will be best understood by reference to Fig. 1. As the rotor is rotated counterclockwise, as seen in Fig. 1, by its drive shaft 14, the rotor teeth 30 carry fluid from the inlet conduit 20 and the inlet chamber 11, to the outlet chamber 12 and outlet conduit 21. The rotor in its counterclockwise movement drives the pinion counterclockwise by reason of the inter-engagement of the rotor and pinion teeth, and the pinion teeth similarly conduct fluid during their movement from the casing inlet to the casing outlet. The fluid is constrained for movement, as stated, by reason of the engagement of the rotor teeth with the pump casing and crescent member, and by reason of the engagement of the pinion teeth with the crescent member. Fluid is prevented from flowing reversely through the pump by reason of the inter-engagement of the pinion and rotor teeth, and by the projecting portion 41 of the casing which engages the outer sides of the rotor teeth at this point of tooth inter-engagement.

The invention relates primarily to the means by which the several pump elements are made and to the resulting manner of co-operation of parts. Heretofore it has been the practice to produce the several pump parts by machine operations. In the case of the gear teeth this required expensive milling and tooth cutting operations. By the present invention several of the parts are die cast. Die casting operations produce accurate castings, sufficiently accurate so that the parts may be interengaged without machining operations. Although some metals are not suitable for die casting because of too high melting point, excess shrinkage, scale forming tendencies and the like, certain hard metals, particularly certain brass alloys, may be die cast. When such hard metals are used, no coating of the parts is necessary. If soft die casting metal is used, such as metal having zinc, lead, tin, or like soft metal as a base, the die castings are electro-plated or otherwise coated with a suitable hard metal such as chromium, which thus renders the casting parts as durable in use as if they were entirely made of hard metal.

The pump casing 10 is preferably an ordinary casting made in any suitable way and machined to proper size. Cast iron may be used with such fluids to be pumped as would not attack it. In cases where cast iron is unsatisfactory, brass or other suitable alloys would be used.

The manner of making the rotor, pinion and crescent member will be best understood by reference first to Figs. 5 to 10, inclusive. The dies for casting the rotor, as shown in Fig. 5, comprise a top die member 44 and a bottom die member 45 suitably clamped together by clamps 46. The bottom die member has a hollow portion 47 therein by which the body of the rotor is formed, and extending downwardly from the portion 47 are the wells 48 which form the rotor teeth. The outer portions 49 of the wells are tapered upwardly and outwardly as shown, and the inner portions 50 of the wells are reversely tapered. These tapered portions give the wells the necessary "draft" which permits removal of the casting from the die member. In the drawings the draft or taper is shown considerably accentuated for clarity of illustration, and this exaggerated showing is uniformly used throughout with respect to all of the parts. However, it is to be understood that in practice the necessary draft is very slight, the taper may be only from 1 to 2 thousandths of an inch per inch. Where necessary the wells may also be tapered or drafted along their sides at right angles to the sides 49 and 50, thereby producing a rotor tooth which is slightly narrower at its end 51 than at its base portion 52. Such taper on the rotor tooth will not interfere with proper meshing with the pinion teeth as will hereinafter appear. The upper die member 44 has a central opening 53 which serves as a gate for the admission of the metal, and a larger opening 53' for the formation of the rotor end bearing piece 13'. The opening 53' is drafted outwardly and downwardly for die removal.

The die by which the pinion is cast, as shown in Fig. 7, comprises an upper die member 55 and a lower die member 56, secured together by clamps 57. The lower die member contains the cavity 58 within which the pinion is formed. As shown, the outer portions 59 of the cavity which form the tops of the teeth and the inner portions 60, which form the bottoms of the teeth, are both tapered upwardly and outwardly to allow the removal of the casting. Likewise, the tooth forming portions may be tapered slightly so that the top portion 61 of the pinion tooth will be formed slightly thicker than the bottom portion 62 of the tooth. The upper die member has the gate 63 through which the metal is poured.

The dies by which a crescent member is formed are shown in Fig. 9 and comprise an upper die member 66 and a lower die member 67, secured together by clamps 68. The cavity 69 for forming the crescent member lies entirely within the lower die member, and the gate 70 is formed through the upper die member. The crescent projection forming portion of the cavity 69 is tapered upwardly and outwardly at 71, thus permitting removal of the casting. The portion 72 is not tapered. The portions 74 are drafted inwardly and downwardly, as shown.

After the rotor and pinion have been cast their outer surfaces are ground parallel to remove the casting taper. The rotor and crescent member are then drilled for the reception of the shafts 14 and 16', respectively, which are press fitted into position. The pinion 15 is also drilled for the reception of shaft 16'. It is to be noted that these machining operations are simple and inexpensive and may be performed, for example, in a grinder and ordinary drilling machine. No expensive machining of the teeth is necessary. After these operations upon the parts they are ready for assembly if hard metal has been used in the casting. If soft metal has been used, the parts must be coated with a suitable hard metal.

The coating is preferably effected by electro-plating, and preferably chromium is used, as chromium is hard and a good plating material. However, it is contemplated by the invention that other suitable hard metals than chromium might be used and that the plating might be effected by means other than electro-plating, such as by dipping or the like. Electro-plating is preferred, as an even and secure coating is produced thereby. The coating may be of such thickness as is required to render the parts strong and durable, but this requires only a thin and relatively inexpensive plate.

The parts are now ready for assembling, as shown in Figs. 3 and 4. The shafts 14 and 16' are pressed into position. The outer sides of the rotor teeth, having been ground parallel, may be readily fitted into the interior 32 of the pump casing. The pinion may then be placed in position upon the crescent member and upon the shaft 16', and these parts then brought into engagement with the rotor and assembled into position by means of bolts 17. A bushing may be fitted into pinion 15 to form the bearing for shaft 16', if desired. The exterior surface of the pinion is parallel so that it fits accurately with the parallel inner surface of the crescent projection and with the interior of the casing. Likewise, the taper on the inner side 33 of the rotor teeth conforms to the taper on the outer surface 34 of the crescent projection and to the taper at the bottoms 39 of the pinion teeth, so that the engagement of the rotor teeth with the crescent projection and pinion teeth will be accurate. Also, the rotor teeth which are narrowed slightly toward their ends 51, will mesh accurately with the pinion teeth, which are correspondingly widened toward their ends 61 which engage with the end portions 51 of the rotor teeth. An accurate tooth engagement is thus insured.

By this means of production and assembly an accurate and efficient engagement of parts is secured. The parts are accurately cast by die casting and are strong and durable. At the same time expensive machining operations are avoided.

It is obvious that various changes may be made, without departing from the spirit of the invention, in the embodiments used for illustration and in the several method steps disclosed. I therefore do not wish to be limited to the precise embodiments and method steps described and shown, but only as indicated in the following claims.

I claim:

1. The method of making a spur gear which comprises casting the gear blank with tapered teeth thereon, and thereafter grinding the peripheral portions of the teeth to an outer cylindrical form, whereby to produce the finished gear.

2. The method of making a gear which comprises die-casting a spur gear blank with axially extending gear teeth formed thereon, the root portion of the gear being of truncated conical form, said gear teeth tapering in thickness in the direction of taper of said conical root portion and having their peripheral surfaces tapering in said direction, and machining the peripheral surfaces only of the gear to a substantially cylindrical form.

3. The method of forming and interfitting gears which comprises die-casting a gear with teeth having their root portions inclined longitudinally toward the gear axis and of uniformly decreasing thickness in the same direction, die-casting a second gear with teeth having root portions of similar inclination and of similarly decreasing thickness, and interfitting the gears with the root portions of the teeth of the respective gears inclined oppositely and the thicker tooth portions on one of the gears in mesh with the thinner tooth portions on the other gear.

4. The method of making a machine unit which comprises die-casting a rotor member having axially extending internal gear teeth, having all gear surfaces thereof tapered toward one end, the exterior portions of the rotor being tapered in the same direction, machining the exterior surface of the rotor to provide a portion of substantially cylindrical form, die-casting a spur gear with axially extending external gear teeth having all gear surfaces thereof tapered in an axial direction, machining the spur gear to an outer cylindrical form, meshing said gears in geared relationship with the tapered surfaces extending oppositely, whereby the gears mesh in complemental relation.

5. The method of making a machine unit which comprises die-casting a rotor member having axially extending internal gear teeth having all gear surfaces thereof tapered toward one end, the exterior portions of the rotor being tapered in the same direction, machining the exterior surface of the rotor to provide a portion of substantially cylindrical form defined by spaced apart outer tooth surfaces, die-casting a spur gear with axially extending external gear teeth, having all gear surfaces thereof tapered in an axial direction, machining the spur gear to an outer cylindrical form, meshing said gears in geared relationship with the tapered surfaces extending oppositely and with the cylindrical surfaces of the two gears in substantial tangency.

BERT A. LINDERMAN.